(12) United States Patent
Nagaki et al.

(10) Patent No.: US 10,352,349 B2
(45) Date of Patent: Jul. 16, 2019

(54) SAFETY HOOK

(71) Applicant: NAGAKI SEIKI CO., LTD., Osaka (JP)

(72) Inventors: Takayuki Nagaki, Osaka (JP); Junsuke Takada, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 335 days.

(21) Appl. No.: 15/310,427

(22) PCT Filed: Jul. 25, 2016

(86) PCT No.: PCT/JP2016/071751
§ 371 (c)(1),
(2) Date: Nov. 10, 2016

(87) PCT Pub. No.: WO2017/141462
PCT Pub. Date: Aug. 24, 2017

(65) Prior Publication Data
US 2018/0223895 A1    Aug. 9, 2018

(30) Foreign Application Priority Data

Feb. 18, 2016 (JP) ................................. 2016-028546

(51) Int. Cl.
*F16B 45/02* (2006.01)
*A62B 35/00* (2006.01)
*F16B 1/02* (2006.01)

(52) U.S. Cl.
CPC .......... *F16B 45/02* (2013.01); *A62B 35/0037* (2013.01); *F16B 1/02* (2013.01); *Y10T 24/4534* (2015.01)

(58) Field of Classification Search
CPC .. F16B 45/02; A62B 35/0037; Y10T 24/4534; Y10T 24/45361; Y10T 24/45366
See application file for complete search history.

(56) References Cited

U.S. PATENT DOCUMENTS 768,090 A * 8/1904 Sweetland ............... A01K 1/04
24/599.5
1,682,617 A * 8/1928 Jensen ..................... E21B 19/04
24/600.1
(Continued)

FOREIGN PATENT DOCUMENTS

CN    201167657 Y    12/2008
JP    48-023858 U    3/1973
(Continued)

OTHER PUBLICATIONS

China Patent Office, Office action dated Sep. 17, 2018.
(Continued)

*Primary Examiner* — Abigail E Troy
(74) *Attorney, Agent, or Firm* — Li & Cai Intellectual Property (USA) Office

(57) ABSTRACT

Provided is a safety hook.
This safety hook is equipped with a hook part, a closing-off body supported by the hook part so as to be capable of swinging, and a first urging member for urging the closing-off body from an open position toward an closing-off position. The closing-off body comprises a closing-off-body base part, a first arm part capable of opening and closing the entrance of the hook part, and a second arm part extending in a direction different from that of the first arm part. The second arm part comprises a closing-off-body operation part. Operating the closing-off-body operation part causes the closing-off body to move from the closing-off position to the open position. The safety hook is further equipped with a lock member for securing the closing-off body in the closing-off position. Operating the lock-member makes it possible to unlock the lock member from the closing-off body.

7 Claims, 3 Drawing Sheets

(56) References Cited

U.S. PATENT DOCUMENTS

| | | | |
|---|---|---|---|
| 4,528,729 A | 7/1985 | Schmidt et al. | |
| 4,977,647 A | 12/1990 | Casebolt | |
| 6,161,264 A | 12/2000 | Choate | |
| 8,015,676 B1 | 9/2011 | Choate | |
| 8,234,758 B2 * | 8/2012 | Liu | A45F 3/02 |
| | | | 24/265 H |
| 2009/0049663 A1 | 2/2009 | Ong | |
| 2009/0193631 A1 | 8/2009 | Liu | |
| 2014/0373319 A1 | 12/2014 | Lin | |

FOREIGN PATENT DOCUMENTS

| | | |
|---|---|---|
| JP | 62-191921 U | 12/1987 |
| JP | 03-026820 | 3/1991 |
| JP | 3010393 U | 2/1995 |
| JP | H08-280828 A | 10/1996 |
| JP | 10-318242 A | 12/1998 |
| JP | 2001-346895 A | 12/2001 |
| JP | 2007-117573 A | 5/2007 |
| WO | WO 2006/076769 A1 | 7/2006 |

OTHER PUBLICATIONS

WIPO, Written Opinion of the International Searching Authority dated Jan. 3, 2017.
Korean Patent Office, Office action dated Dec. 20, 2017.
European Patent Office, Patent Search Report dated Feb. 9, 2018.
Japan Patent Office, Office action dated May 17, 2016 regarding JP2016-028546.
European Patent Office, Office action dated Feb. 8, 2019.

* cited by examiner

SAFETY HOOK

TECHNICAL FIELD

The present invention relates to a safety hook comprising a hook part and a closing-off part capable of closing off the entrance of the hook part. This safety hook is used when, e.g., a worker is performing work at an elevated location, the safety hook being used to cause a rope for preventing the worker from falling to be locked into place in a locked member.

TECHNICAL BACKGROUND

When a worker is to perform work at an elevated location, a safety hook provided at the distal end of a rope or the like for preventing the worker from falling is locked into place in a locked member.

For example, Patent Document 1 (Japanese Laid-open Patent Publication No. 2007-117573) discloses a safety hook comprising a hook part and an open/close bar. In the safety hook described in Patent Document 1, the open/close bar is provided with a recess into which fingertips can enter. The safety hook described in Patent Document 1 is configured such that the opening of the hook is opened once fingertips arranged in the recess apply pressure to the open/close bar.

Patent Document 2 (Japanese Laid-open Patent Publication No. 2001-346895) discloses a hook comprising a latch lock structure. The hook described in Patent Document 2 comprises a hook body, an open/close body, and a blocking body. The open/close body is pivotably mounted on the hook body so as to open and close the opening of the hook body. The blocking body is pivotably mounted on the hook body so as to be capable of preventing the open/close body from swinging open. When the open/close body is to be opened, a worker first applies pressure to an operation part of the blocking body to disengage the blocking body and the open/close body. The worker then applies pressure to the hook body to open the open/close body.

PRIOR ARTS LIST

Patent Documents

Patent Document 1: Japanese Laid-open Patent Publication No. 2007-117573

Patent Document 2: Japanese Laid-open Patent Publication No. 2001-346895

SUMMARY OF THE INVENTION

Problems to be Solved by the Invention

When a worker is working at an elevated location or the like, the worker often works while wearing gloves. Particularly in cases when a worker is carrying out electrical construction or the like, it is necessary for the worker to wear heavyweight rubber gloves in order to prevent them from being electrically shocked. Therefore, there are many cases in which workers lock a safety hook into place in a locked member while wearing gloves. However, in the hooks described in Patent Documents 1 and 2, when pressure is applied to the open/close bar, the fingers of the worker or the glove worn on said fingers might get sandwiched (or caught) between the distal end of the open/close bar and the distal end of the hook. Particularly in cases when a worker is holding another tool in the other hand, it is not easy to extricate the caught glove from between the distal end of the hook part and the distal end of the open/close bar.

In view of the problem that gloves readily get caught when worn while operating a safety hook, a technological development for overcoming this problem was contrived in the present invention. As a result, it has been discovered that the aforementioned problem can be overcome through creatively addressing the configuration and/or arrangement of a closing-off body for closing off the entrance of a hook part.

Specifically, the purpose of the present invention is to provide a safety hook in which gloves or fingers are not readily sandwiched between the distal-end part of a hook part and the distal-end part of a closing-off body.

Means to Solve the Problems

The present invention pertains to the safety hook indicated below.

(1) A safety hook, characterized by being equipped with:
  a hook part;
  a closing-off body supported by the hook part so as to be capable of swinging about a first shaft, the closing-off body coming into contact with a hook-part distal-end part, which is the distal-end part of the hook part, when located at an closing-off position, and separating from the hook-part distal-end part to open the entrance of the hook part when located at an open position; and
  a first urging member for urging the closing-off body from the open position toward the closing-off position;
  the closing-off body comprising:
  a closing-off-body base part, which is a portion supported by the hook part;
  a first arm part capable of opening and closing the entrance of the hook part, the first arm part extending from the closing-off-body base part; and
  a second arm part extending from the closing-off-body base part, the second arm part extending along a direction different from the direction along which the first arm part extends;
  the second arm part comprising a closing-off-body operation part for causing the closing-off body to move from the closing-off position to the open position;
  the closing-off-body operation part being arranged on the opposite side of the hook part from the entrance.

(2) The safety hook according to (1), characterized in that:
  the safety hook is further equipped with a lock member for securing the closing-off body at the closing-off position; and
  a lock member operation-part for operating the lock member is arranged on the same side of the hook part as is the closing-off-body operation part.

(3) The safety hook according to (1), characterized in that:
  the safety hook is further equipped with a lock member for securing the closing-off body at the closing-off position; and
  a lock-member operation part for operating the lock member is arranged on the opposite side of the hook part from the closing-off-body operation part.

(4) The safety hook according to (2) or (3), characterized in that:
  both the closing-off-body operation part and the lock-member operation part can be operated while the base part of the hook part is supported in one hand, without changing the position of the palm of the one hand.

(5) The safety hook according to any of (2) to (4), characterized in that:

the closing-off-body operation part and the lock-member operation part are configured such that the lock member can be unlocked, and the closing-off body can be moved from the closing-off position to the open position, by an action in which the thumb and a finger other than the thumb are moved in directions such that these fingers move relatively closer to each other.

(6) The safety hook according to any of (2) to (5), characterized in that:

the safety hook further comprises a second urging member for urging the lock member from an unlocked position toward a locked position; and the urging force of the second urging member is less than the urging force of the first urging member.

Advantageous Effects of the Invention

The present invention makes it possible to provide a safety hook in which gloves or fingers are not readily sandwiched between the distal-end part of a hook part and the distal-end part of a closing-off body.

BRIEF DESCRIPTION OF THE DRAWINGS

FIG. 2(A) shows a state in which a closing-off body is located at an closing-off position, and FIG. 2(B) shows a state in which the closing-off body is located at an open position; FIG. 3(A) shows a state in which a closing-off body is located at an closing-off position, and FIG. 3(B) shows a state in which the closing-off body is located at an open position.

DESCRIPTION OF THE EMBODIMENTS

Figure 1:
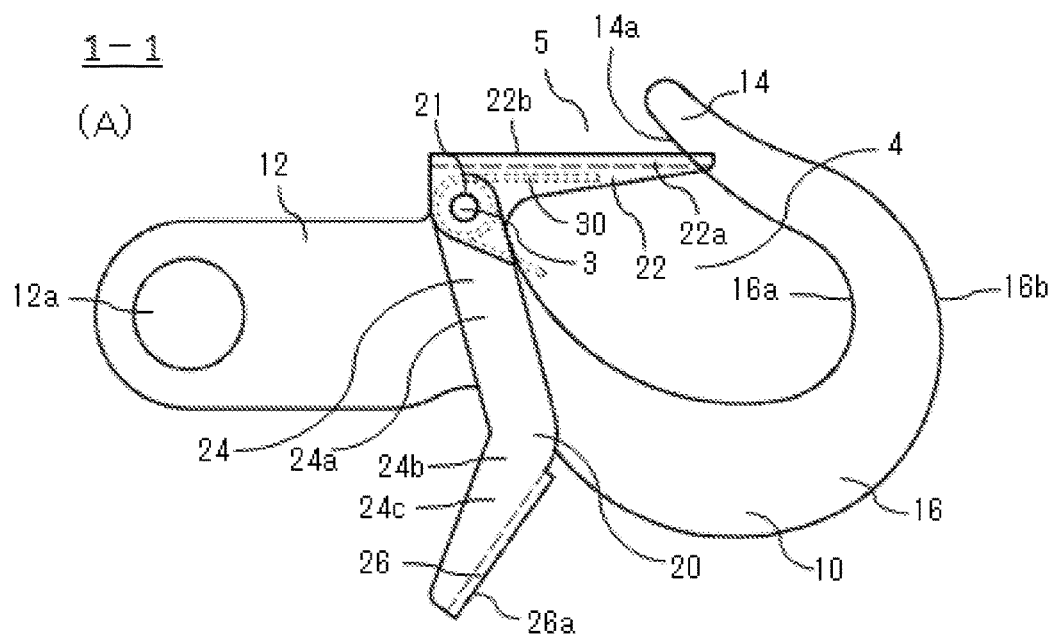
FIG. 1(A) is a side view schematically showing a safety hook according to a first embodiment.
FIG. 1(B) is a top view schematically showing the safety hook according to the first embodiment.
Figure 1:
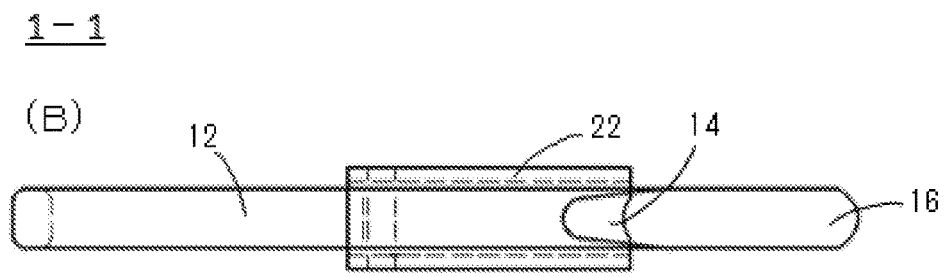

Safety hooks according to embodiments are described in detail below with reference to the drawings. In the specification, the same or similar reference signs are attached to members having the same function. There are cases in which descriptions are not repeated for members to which the same or similar reference signs are attached.

First Embodiment

A first embodiment is described with reference to FIGS. 1(A) and 1(B). FIG. 1(A) is a side view schematically showing one example of a safety hook of the first embodiment. FIG. 1(B) is a top view schematically showing the safety hook of the first embodiment. The safety hook 1-1 comprises at least a hook part 10, a closing-off body 20, and a first urging member 30.

The hook part 10 comprises a hook-form part 16; i.e., a portion for receiving a locked member. The hook-form part 16 may be of any configuration, as long as the configuration includes a space into which a locked member is inserted and an entrance continuous with the space. The hook-form part 16 may be, e.g., C-shaped or U-shaped. The inner side of the hook-form part 16 defines a space 4 into which a locked member is inserted. The locked member is a rod-shaped body, a pipe body, a cord body, a rope, a wire, a clasp, or the like.

The hook part 10 comprises a hook-part base part 12 and a hook-part distal-end part 14. A fall-preventing rope or the like is locked into place in the hook-part base part 12. In the example illustrated in FIG. 1(A), the hook-part base part 12 is provided with a through-hole 12a into which a rope for preventing a fall, or another such cord-form member, is locked into place. The base end of the hook-form part 16 is provided to the distal end of the hook-part base part 12. In the example illustrated in FIG. 1(A), the hook-part base part 12 and the hook-form part 16 are integrally molded. The hook-part distal-end part 14 is provided to the distal end of the hook-form part 16. The inside surface 14a of the hook-part distal-end part 14; i.e., the surface facing the space 4, functions as a stopper part for receiving a first arm part 22 (described later). In addition to being used to prevent falling, the safety hook of the present invention can be used in combination with a wire grip, which is a device for tensioning electrical cables, and can also be used as a hook provided to the distal end of a rope that is wound around a winch. In cases when the safety hook is combined with another device, the safety hook may be coupled with the other device by a chain or wire through the through-hole 12a. In cases when the safety hook of the present invention is provided to the distal end of a rope that is wound around a winch, the distal end of the rope may be attached to the through-hole 12a.

A first shaft 3 is arranged in the hook part 10; more specifically, in the hook-part base part 12. Specifically, the first shaft 3 is arranged so as to pass through the hook-part base part 12. The first shaft 3 defines the center about which the closing-off body 20 swings, and may be arranged so as to pass through the closing-off-body base part 21 (described later). The direction in which the first shaft 3 extends is perpendicular to the plane in which the closing-off body 20 swings.

The closing-off body 20 is supported by the hook part 10 so as to be capable of swinging about the first shaft 3. The closing-off body 20 comprises a closing-off-body base part 21, a first arm part 22, and a second arm part 24.

The closing-off-body base part 21 is a portion supported by the hook part 10. The closing-off-body base part 21 may be supported by the hook part 10 with a shaft pin interposed therebetween, the shaft pin being arranged along the first shaft 3. The shaft pin may be separate from the hook part 10 and the closing-off body 20. For example, through-holes for receiving the shaft pin may be provided to each of the hook part 10 and the closing-off body 20. Alternatively, the shaft pin may be formed integrally with one of the hook part 10 and the closing-off body 20.

The first arm part 22 is a portion capable of opening and closing the entrance 5 of the hook part 10, the first arm part 22 extending from the closing-off-body base part 21. The entrance 5 is the boundary between the space 4 inside the hook-form part 16 (the space inward from the inside surface 16a of the hook-form part 16) and the outside of the hook-form part 16. In the example illustrated in FIG. 1(A), the entrance 5 is an opening portion positioned between the hook-part distal-end part 14 and the first shaft 3. When the closing-off body 20 is located at the closing-off position shown in FIG. 1(A), the distal-end part 22a of the first arm part 22 is in contact with the inside surface 14a of the hook-part distal-end part 14. The first arm part 22 extends along a first direction, where the first direction is defined as the direction facing toward the distal-end part 22a from the closing-off-body base part 21. When the closing-off body 20 is located at an open position, the distal-end part 22a of the first arm part 22 enters an inside region (i.e., the space 4) in the hook-form part 16, and the entrance 5 is opened.

The second arm part 24 is a portion comprising a closing-off-body operation part 26, the second arm part 24 extending from the closing-off-body base part 21. The second arm part 24 extends along a direction different from the first direction along which the first arm part 22 extends. Specifically, the second arm part 24 extends from the closing-off-body base part 21 such that the closing-off-body base part 21 is arranged between the first arm part 22 and the second arm part 24. In the example illustrated in FIG. 1(A), the second arm part 24 comprises a second-arm-part base part 24a, a bent part 24b, and a second-arm-part distal-end part 24c. In the example illustrated in FIG. 1(A), the angle formed between the first direction, which is the direction in which the first arm part 22 extends from the closing-off-body base part 21 (more specifically, from the first shaft 3), and a second direction, which is the direction in which the second-arm-part base part 24a extends from the closing-off-body base part 21 (more specifically, from the first shaft 3), is approximately 90°; however, this angle may be set within a range of 60-120°.

The closing-off-body operation part 26 is provided to the second arm part 24. More specifically, the closing-off-body operation part 26 is provided to the second-arm-part distal-end part 24c. The closing-off-body operation part 26 is arranged outward from the hook part 10; more specifically, outward from the hook-form part 16. In the example illustrated in FIG. 1(A), the closing-off-body operation part 26 is arranged on the opposite side of the hook part 10 from the entrance 5. The closing-off-body operation part 26 is a portion for causing the closing-off body 20 to move from the closing-off position to the open position. In the example illustrated in FIG. 1(A), pressing the closing-off-body operation part 26 in a direction away from the default position, which corresponds to the closing-off position of the closing-off body 20, such that the closing-off-body operation part 26 approaches the hook-part base part 12 causes the closing-off body 20 to move from the closing-off position to the open position. Specifically, the first arm part 22 moves into the space 4. The closing-off-body operation part 26 does not enter the space 4 when the closing-off body 20 moves from the closing-off position to the open position.

In the example illustrated in FIGS. 1(A) and 1(B), a worker can perform an operation on the closing-off-body operation part 26 using a finger (e.g., the thumb) of one hand while the hook-part base part 12 is supported in the palm of the one hand. Specifically, the worker can very easily execute the action of opening the closing-off body 20.

The first urging member 30 urges the closing-off body 20 from the open position toward the closing-off position. One end of the first urging member 30 contacts the hook part 10, and the other end of the first urging member 30 contacts the closing-off body 20. In the example illustrated in FIG. 1(A), the first urging member 30 includes a helical torsion coil spring. One end of the helical torsion coil spring is in contact with the hook-part base part 12, and the other end of the helical torsion coil spring is in contact with the first arm part 22 (more specifically, the rear surface of the first arm part 22; i.e., the surface facing the space 4). Arranging the first urging member 30 in this manner minimizes accidental opening of the entrance 5 of the hook part 10. This results in enhanced safety.

In the first embodiment, the closing-off-body operation part 26 is arranged outward from the hook part 10. Therefore, when the closing-off-body operation part 26 is to be operated, no glove or finger will get sandwiched between the distal-end part 14 of the hook part and the distal-end part 22a of the closing-off body 20.

In the example illustrated in FIG. 1(A), the bent part 24b is provided to the second arm part 24 such that the position of the closing-off-body operation part 26 approaches the hook-part base part 12. Therefore, the action of opening the closing-off body 20 is even more easily executed by the worker. In the example illustrated in FIG. 1(A), an operation surface 26a is provided to the closing-off-body operation part 26. The operation surface 26a is oriented along a direction in which the distance from the longitudinal central axis of the hook-part base part 12 increases. Specifically, the angle formed between the operation surface 26a and the longitudinal direction of the hook-part base part 12 is less than 90° (e.g., within the range of 30-80°). Therefore, it is very easy to perform an operation such that the closing-off-body operation part 26 is caused to approach the hook-part base part 12. Furthermore, because a worker can execute the action of opening the closing-off body 20 by pressing the operation surface 26a, which is arranged outward from the hook part 10, no glove or finger will get sandwiched between the closing-off body 20 and the hook part 10 when the closing-off body 20 swings.

In the example illustrated in FIG. 1, as viewed from the direction in which the first shaft 3 extends, the second arm part 24 does not overlap the space 4 when the closing-off body 20 is located at the closing-off position or when the closing-off body 20 is located at the open position. Therefore, unnecessary force acting on the second arm part 24 due to the locked member arranged in the space 4 is minimized. The position at which the first shaft 3 is formed and the angle between the first arm part 22 and second arm part 24 may be adjusted in order to configure the second arm part 24 so as not to overlap with the space 4.

In the closing-off body 20, the closing-off-body base part 21, first arm part 22, and second arm part 24 may be formed from two plate parts so as to sandwich the hook part 10. The first arm part 22 may be coupled by a coupling plate 22b, and the second arm part 24 may also be coupled by a coupling plate. In the example illustrated in FIG. 1(A), the coupling plate of the second arm part 24 is used as the operation surface 26a. Alternatively, the closing-off body 20 may instead be formed from one plate part. In such a case, the first arm part 22 may be formed in substantially an L-shape, and the width of the distal-end part 22a in contact with the inside surface 14a of the hook-part distal-end part 14 may be increased, as necessary. Additionally, a configuration may be adopted in which the second-arm-part distal-end part 24c is also formed in substantially an L-shape, as necessary, thereby forming the operation surface 26a.

Second Embodiment

Figure 2:
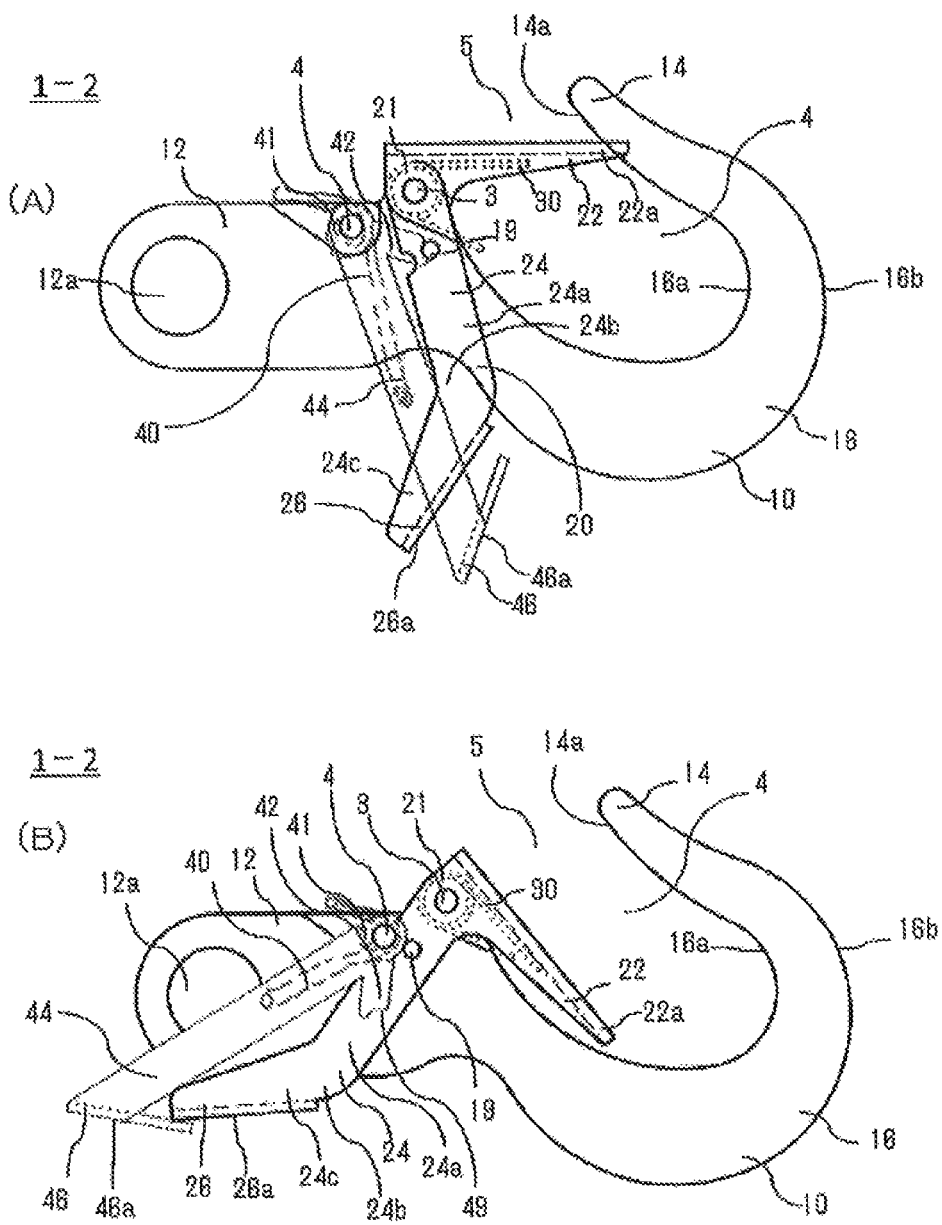
FIGS. 2(A) and 2(B) are side views schematically showing a safety hook according to a second embodiment, where

A second embodiment is described with reference to FIGS. 2(A) and 2(B). FIGS. 2(A) and 2(B) are side views schematically showing a safety hook according to the second embodiment. FIG. 2(A) shows a state in which a closing-off body is located at an closing-off position, and FIG. 2(B) shows a state in which the closing-off body is located at an open position.

The safety hook 1-2 of the second embodiment differs from the safety hook 1-1 of the first embodiment in that the safety hook 1-2 comprises a lock member 40, the closing-off body 20 is provided with a first engagement member 19 capable of engaging with the lock member 40, and the hook part 10 is provided with a mechanism for supporting the lock member 40. The second embodiment is otherwise identical to the first embodiment. As pertains to the structural elements of the safety hook 1-2 of the second embodiment, repeat descriptions are omitted for structural elements corresponding to structural elements that have already been described in the first embodiment.

The lock member 40 secures the closing-off body 20 in the closing-off position. The lock member 40 comprises a lock-member operation part 46 for operating the lock member 40. The lock-member operation part 46 is arranged on the same side of the hook part 10 as is the closing-off-body operation part 26.

The lock member 40 is supported by the hook part 10 so as to be capable of swinging about a second shaft 4. The lock member 40 comprises a lock-member base part 41, a lock-member first arm part 42, and a lock-member second arm part 44.

The lock-member base part 41 is a portion supported by the hook part 10. The lock-member base part 41 may be supported by the hook part 10 with a shaft pin interposed therebetween, the shaft pin being arranged along the second shaft 4. The shaft pin may be separate from the hook part 10 and the lock member 40. For example, through-holes for receiving the shaft pin may be provided to each of the hook part 10 and the lock member 40. Alternatively, the shaft pin may be formed integrally with one of the hook part 10 and the lock member 40.

The second shaft 4 is arranged so as to pass through the hook-part base part 12 and the lock-member base part 41. The second shaft 4 defines the center of swinging of the lock member 40. The direction in which the second shaft 4 extends is perpendicular to the plane in which the lock member 40 swings.

The lock-member first arm part 42 is a portion comprising a second engagement member 49 (see FIG. 2(B)) for engaging with the first engagement member 19 of the closing-off body 20, the lock-member first arm part 42 extending from the lock-member base part 41. In the example illustrated in FIG. 2(A), the first engagement member 19 is a pin arranged in the second arm part 24, and the second engagement member 49 is a recess provided to the lock-member first arm part 42. Alternatively, a configuration may be adopted in which the first engagement member 19 is a recess or protrusion, and the second engagement member 49 is a protrusion or recess for engaging with the recess or protrusion constituting the first engagement part 19. When the first engagement member 19 and the second engagement member 49 are engaged with each other, the closing-off body 10 is secured at the closing-off position by the lock member 40. When the first engagement member 19 and the second engagement member 49 are not engaged with each other, the closing-off-body operation part 26 of the closing-off body 10 can be operated, whereby the closing-off body 20 can open the entrance 5 of the hook part 10.

The lock-member second arm part 44 is a portion comprising a lock-member operation member 46, the lock-member second arm part 44 extending from the lock-member base part 41. The lock-member second arm part 44 extends along a direction different from the direction along which the lock-member first arm part 42 extends. Specifically, the lock-member second arm part 44 extends from the lock-member base part 41 such that the lock-member base part 41 is arranged between the lock-member first arm part 42 and the lock-member second arm part 44. In the example illustrated in FIG. 2(A), the angle formed between a third direction, which is the direction in which the lock-member first arm part 42 extends from the lock-member base part 41 (more specifically, from the second shaft 4), and a fourth direction, which is the direction in which the lock-member second arm part 44 extends from the lock-member base part 41 (more specifically, from the second shaft 4), is set within a range of 30-90°.

The lock-member operation part 46 is provided to the lock-member second arm part 44. The lock-member operation part 46 is arranged outward from the hook part 10; more specifically, outward from the hook-form part 16 (outward from the outside surface 16b of the hook-form part 16). In the example illustrated in FIG. 2(A), the lock-member operation part 46 is arranged further away from the hook-part base part 12 than is the closing-off-body operation part 26. The lock-member operation part 46 is a portion for causing the lock member 40 to move from the locked position (the position corresponding to the state in which the first engagement member 19 and the second engagement member 49 are engaged with each other) to the unlocked position (the position corresponding to the state in which the first engagement member 19 and the second engagement member 49 are disengaged from each other). In the example illustrated in FIGS. 2(A) and 2(B), pressing the lock-member operation part 46 in a direction away from the default position (see FIG. 2(A)), which corresponds to the locked position, such that the lock-member operation part 46 approaches the hook-part base part 12 causes the lock member 40 to move from the locked position to the unlocked position (see FIG. 2(B)).

In the example illustrated in FIGS. 2(A) and 2(B), a worker can perform an operation on the lock-member operation part 46 using a finger (e.g., the thumb) of one hand while the hook-part base part 12 is supported in the palm of the one hand. Additionally, in the example illustrated in FIGS. 2(A) and 2(B), using a finger of one hand to move the lock-member operation part 46 in a fifth direction (the direction toward the hook-part base part 12) unlocks the lock member 40. Continuing to move the lock-member operation part 46 in the fifth direction (the direction toward the hook-part base part 12) causes pressure to be applied to the closing-off-body operation part 26 via the lock-member operation part 46, making it possible to cause the closing-off body 20 to move to the open position. Specifically, in the example illustrated in FIGS. 2(A) and 2(B), it is possible to operate both the lock-member operation part 46 and the closing-off-body operation part 26 without changing the position of the palm of the one hand. Additionally, in the example illustrated in FIGS. 2(A) and 2(B), the closing-off-body operation part 26 can be operated via the lock-member operation part 46. Specifically, it is possible to execute the action of unlocking the lock member 40 and the action of opening the closing-off body 20 merely by operating the lock-member operation part 46. Additionally, in the example illustrated in FIGS. 2(A) and 2(B), the worker can operate both the lock-member operation part 46 and the closing-off-body operation part 26 through performing an action for moving the thumb of one hand and a finger other than the thumb of the one hand in directions such that these fingers move relatively closer to each other while the hook-part base part 12 is supported in the palm of the one hand. As described above, in the example illustrated in FIGS. 2(A) and 2(B), the worker can very easily execute the action of unlocking the lock member 40 and the action of opening the closing-off body 20.

In the second embodiment, a second urging member (not shown in FIGS. 2(A) and 2(B), in order to avoid complicating the drawings) may be provided for urging the lock member 40 from the unlocked position toward the locked position. One end of the second urging member is in contact with the hook part 10, and the other end of the second urging member is in contact with the lock member 40. The second urging member may be a helical torsion coil spring. Arranging the second urging member in this manner minimizes accidental unlocking of the lock member 40. This results in enhanced safety. The urging force of the second urging member may be less than the urging force of the first urging member 30. Setting the urging force of the second urging member to less than the urging force of the first urging member 30 makes it possible for a worker to know, by finger contact, that the action of unlocking the lock member 40 has concluded, and the action of opening the closing-off body 20 has commenced. The urging force of the second urging member is preferably set to a strength such that, when the pressure applied to the lock-member operation part 46 is stopped, the lock member 40 located at the unlocked position automatically returns to the locked position. This setting further enhances safety.

In the second embodiment, the lock-member operation part 46 for operating the lock member 40 is arranged on the same side of the hook part 10 as is the closing-off-body operation part 26. Therefore, it is possible to operate the lock-member operation part 46 and the closing-off-body operation part 26 using one finger.

In the example illustrated in FIG. 2(A), an operation surface 46a is provided to the lock-member operation part 46. The operation surface 46a is oriented along a direction in which the distance from the longitudinal central axis of the hook-part base part 12 increases. Specifically, the angle formed between the operation surface 46a and the longitudinal direction of the hook-part base part 12 is less than 90° (e.g., within the range of 30-80°). Therefore, it is very easy to perform an operation such that the lock-member operation part 46 approaches the hook-part base part 12.

In cases when the closing-off body 20 is formed from two plate parts so as to sandwich the hook part 10, a configuration may be adopted in which the lock member 40 is also formed from two plate parts such that part of the lock member 40 sandwiches the closing-off body 20, and the lock-member second arm part 44 is coupled by a coupling plate. In the example illustrated in FIGS. 2(A) and 2(B), the coupling plate is used as the operation surface 46a. Alternatively, the lock member 40 may instead be formed on one plate-part side of the closing-off body 20. In such a case, a configuration may be adopted in which the distal-end portion of the lock-member second arm part 44 is formed in substantially an L-shape, thereby forming the operation surface 46a. When the closing-off body 20 is formed from one plate part, the lock member 40 may be formed on the same side as the closing-off body 20.

When the safety hook is locked on a wire or another deformable locked member, the first arm part 22 of the closing-off body 20 could be pushed upward due to twisting of the locked member. Specifically, there is a possibility that the locked member could separate from the safety hook due to twisting of the locked member, even when the closing-off-body operation part 26 has not been operated. However, the safety hook 1-2 in the second embodiment comprises the lock member 40. Therefore, the locked member does not separate from the safety hook 1-2 even when twisted, resulting in enhanced safety.

Third Embodiment

Figure 3:
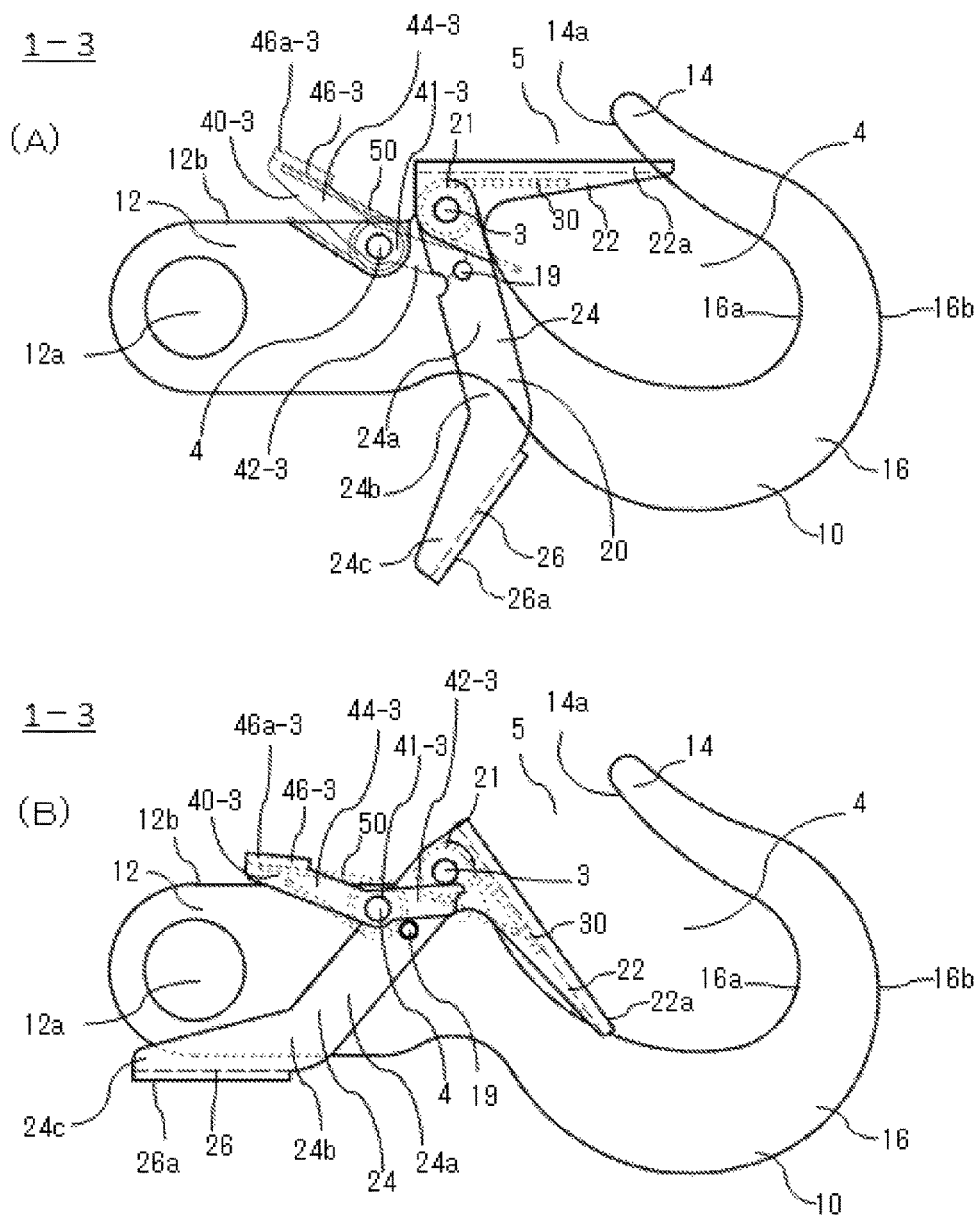
FIGS. 3(A) and 3(B) are side views schematically showing a safety hook according to a third embodiment, where

A third embodiment is described with reference to FIGS. 3(A) and 3(B). FIGS. 3(A) and 3(B) are side views schematically showing a safety hook according to the third embodiment. FIG. 3(A) shows a state in which a closing-off body is located at an closing-off position, and FIG. 3(B) shows a state in which the closing-off body is located at an open position The safety hook 1-3 of the third embodiment differs from the safety hook 1-1 of the first embodiment in that the safety hook 1-3 comprises a lock member 40-3, the closing-off body 20 is provided with a first engagement member 19 capable of engaging with the lock member 40-3, and the hook part 10 is provided with a mechanism for supporting the lock member 40-3. The third embodiment is otherwise identical to the first embodiment. Additionally, the configuration and arrangement of the lock member 40-3 of the safety hook 1-3 of the third embodiment differ from the configuration and arrangement of the lock member 40 of the safety hook of the second embodiment. As pertains to the structural elements of the safety hook 1-3 of the third embodiment, repeat descriptions are omitted for structural elements corresponding to structural elements that have already been described in the first embodiment or second embodiment.

The lock member 40-3 secures the closing-off body 20 in the closing-off position. The lock member 40-3 comprises a lock-member operation part 46-3 for operating the lock member 40-3. The lock-member operation part 46-3 is arranged on the opposite side of the hook part 10 from the closing-off-body operation part 26.

The lock member 40-3 is supported by the hook part 10 so as to be capable of swinging about the second shaft 4. The lock member 40-3 comprises a lock-member base part 41-3, a lock-member first arm part 42-3, and a lock-member second arm part 44-3.

The lock-member base part 41-3 is a portion supported by the hook part 10. The lock-member base part 41-3 may be supported by the hook part 10 may be supported by the hook part 10 with a shaft pin interposed therebetween, the shaft pin being arranged along the second shaft 4. The shaft pin may be separate from the hook part 10 and the lock member 40-3. For example, through-holes for receiving the shaft pin may be provided to each of the hook part 10 and the lock member 40-3. Alternatively, the shaft pin may be formed integrally with one of the hook part 10 and the lock member 40-3.

The second shaft 4 is arranged so as to pass through the hook-part base part 12 and the lock-member base part 41-3. The second shaft 4 defines the center of swinging of the lock member 40-3. The direction in which the second shaft 4 extends is perpendicular to the plane in which the lock member 40-3 swings.

The lock-member first arm part 42-3 is a portion comprising a second engagement member for engaging with the first engagement member 19 of the closing-off body 20, the lock-member first arm part 42-3 extending from the lock-member base part 41-3. In the example illustrated in FIG. 3(A), the first engagement member 19 is a pin arranged in the second arm part 24, and the second engagement member is a recess provided to the lock-member first arm part 42-3. Alternatively, a configuration may be adopted in which the first engagement member 19 is a recess or protrusion, and the second engagement member is a protrusion or recess for engaging with the recess or protrusion constituting the first engagement part 10. When the first engagement member 19 and the second engagement member are engaged with each other, the closing-off body 10 is secured at the closing-off position by the lock member 40-3. When the first engagement member 19 and the second engagement member are not engaged with each other, the closing-off-body operation part 26 of the closing-off body 10 can be operated, whereby the closing-off body 20 can open the entrance 5 of the hook part 10.

The lock-member second arm part 44-3 is a portion comprising a lock-member operation member 46-3, the lock-member second arm part 44 extending from the lock-member base part 41-3. The lock-member second arm part 44-3 extends along a direction different from the direction along which the lock-member first arm part 42-3 extends. Specifically, the lock-member second arm part 44-3 extends from the lock-member base part 41-3 such that the lock-member base part 41-3 is arranged between the lock-member first arm part 42-3 and the lock-member second arm part 44-3. In the example illustrated in FIG. 3(A), the angle formed between a third direction, which is the direction in which the lock-member first arm part 42-3 extends from the lock-member base part 41-3 (more specifically, from the second shaft 4), and a fourth direction, which is the direction in which the lock-member second arm part 44-3 extends from the lock-member base part 41-3 (more specifically, from the second shaft 4), is set within a range of 90-180°.

The lock-member operation part 46-3 is provided to the lock-member second arm part 44-3. The lock-member operation part 46-3 is arranged outward from the hook part 10; more specifically, outward from the hook-part base part 12 (outward from the outside surface 12b of the hook-part base part 12). The lock-member operation part 46-3 is a portion for causing the lock member 40-3 to move from the locked position (the position corresponding to the state in which the first engagement member 19 and the second engagement member are engaged with each other) to the unlocked position (the position corresponding to the state in which the first engagement member 19 and the second engagement member are disengaged from each other). In the example illustrated in FIGS. 3(A) and 3(B), pressing the lock-member operation part 46-3 in a direction away from the default position (see FIG. 3(A)), which corresponds to the locked position, such that the lock-member operation part 46-3 approaches the hook-part base part 12 causes the lock member 40-3 to move from the locked position to the unlocked position (see FIG. 3(B)).

In the example illustrated in FIGS. 3(A) and 3(B), a worker can perform an operation on the lock-member operation part 46-3 using a finger (e.g., the index finger, middle finger, or fourth finger) of one hand while the hook-part base part 12 is supported in the palm of the one hand. Additionally, in the example illustrated in FIGS. 3(A) and 3(B), using a finger of one hand to move the lock-member operation part 46-3 in a sixth direction (the direction toward the hook-part base part 12 from the default position of the lock-member operation part 46-3) unlocks the lock member 40-3. Continuing on to move the closing-off-body operation part 26 in a fifth direction (the direction toward the hook-part base part 12 from the default position of the closing-off-body operation part 26) using the thumb or other finger while the hook-part base part 12 is supported in the palm of the one hand makes it possible to cause the closing-off body 20 to move to the open position. Specifically, in the example illustrated in FIGS. 3(A) and 3(B), it is possible to operate both the lock-member operation part 46-3 and the closing-off-body operation part 26 without changing the position of the palm of the one hand. Additionally, in the example illustrated in FIGS. 3(A) and 3(B), the worker can operate both the lock-member operation part 46 and the closing-off-body operation part 26 through performing an action for moving the thumb of one hand and a finger other than the thumb of the one hand in directions such that these fingers move relatively closer to each other while the hook-part base part 12 is supported in the palm of the one hand. As described above, in the example illustrated in FIGS. 3(A) and 3(B), the worker can very easily execute the action of unlocking the lock member 40-3 and the action of opening the closing-off body 20.

In the third embodiment, a second urging member 50 may be provided for urging the lock member 40-3 from the unlocked position toward the locked position. One end of the second urging member 50 is in contact with the hook part 10, and the other end of the second urging member 50 is in contact with the lock member 40-3. In the example illustrated in FIGS. 3(A) and 3(B), the second urging member 50 includes a helical torsion coil spring. One end of the helical torsion coil spring is in contact with the hook-part base part 12, and the other end of the helical torsion coil spring is in contact with the lock-member second arm part 44-3 (more specifically, the rear surface of the lock-member operation part 46-3; i.e., the surface facing the hook-part base part 12). Arranging the second urging member 50 in this manner minimizes accidental unlocking of the lock member 40-3. This results in enhanced safety. The urging force of the second urging member 50 may be less than the urging force of the first urging member 30. Setting the urging force of the second urging member to less than the urging force of the first urging member 30 makes it possible for a worker to smoothly execute a series of actions when the lock-member operation part 46-3 and the closing-off-body operation part 26 are simultaneously pressed, whereby, first, the lock member 40-3 is unlocked, and then, the closing-off body 20 is removed from the entrance 5. The urging force of the second urging member 50 is preferably set to a strength such that, when the pressure applied to the lock-member operation part 46-3 is stopped, the lock member 40-3 located at the unlocked position automatically returns to the locked position. This setting further enhances safety.

In the third embodiment, the lock-member operation part 46-3 for operating the lock member 40-3 is arranged on the opposite side of the hook part 10 from the closing-off-body operation part 26, and the directions in which the two operation parts move differ from each other. Therefore, even when pressing force is accidentally applied to either the lock-member operation part 46-3 or the closing-off-body operation part 26, the closing-off body 20 is not opened. Therefore, safety is further enhanced.

In the example illustrated in FIG. 3(A), an operation surface 46a-3 is provided to the lock-member operation part 46-3. The operation surface 46a-3 is oriented along a direction in which the distance from the longitudinal central axis of the hook-part base part 12 increases. Specifically, the angle formed between the operation surface 46a-3 and the longitudinal direction of the hook-part base part 12 is less than 90° (e.g., within the range of 10-80°). Therefore, it is very easy to perform an operation such that the lock-member operation part 46-3 approaches the hook-part base part 12.

In cases when the closing-off body 20 is formed from two plate parts so as to sandwich the hook part 10, a configuration may be adopted in which the lock member 40-3 is also formed from two plate parts such that part of the lock member 40-3 sandwiches the closing-off body 20, and the lock-member second arm part 44-3 is coupled by a coupling plate. In the example illustrated in FIGS. 3(A) and 3(B), the coupling plate is used as the operation surface 46a-3. Alternatively, the lock member 40-3 may instead be formed on one plate-part side of the closing-off body 20. In such a case, a configuration may be adopted in which the distal-end portion of the lock-member second arm part 44-3 is formed in substantially an L-shape, thereby forming the operation surface 46a-3. When the closing-off body 20 is formed from one plate part, the lock member 40-3 may be formed on the same side as the closing-off body 20.

The safety hook 1-3 of the third embodiment also comprises a lock member 40-3. Therefore, similarly to the second embodiment, the locked member does not separate from the safety hook 1-3 even when twisted, resulting in enhanced safety.

INDUSTRIAL APPLICABILITY

Using the safety hook of the present invention reduces the possibility of gloves or fingers being sandwiched between the distal-end part of the hook part and the distal-end part of the closing-off body. Therefore, a worker can smoothly lock the safety hook into a locked member. Therefore, this safety hook has utility for both manufacturers of the safety hook and construction workers using the safety hook.

REFERENCE SIGNS LIST

1-1 to 1-3: Safety hook
3: First shaft
4: Second shaft
5: Entrance
10: Hook part
12: Hook-part base part
12a: Through-hole
12b: Outside surface
14: Hook-part distal-end part
14a: Inside surface
16: Hook-form part
16a: Inside surface
16b: Outside surface
19: First engagement member
20: Closing-off body
21: Closing-off-body base part
22: First arm part
22a: Distal-end part
22b: Coupling plate
24: Second arm part
24a: Second-arm-part base part
24b: Bent part
24c: Second-arm-part distal-end part
26: Closing-off-body operation part
26a: Operation surface
30: First urging member
40 to 40-3: Lock member
41 to 41-3: Lock-member base part
42 to 42-3: Lock-member first arm
44 to 44-3: Lock-member second arm
46 to 46-3: Lock-member operation part
46a to 46a-3: Operation surface
49: Second engagement member
50: Second urging member

The invention claimed is:

1. A safety hook, comprising:
    a hook part having a hook-part distal-end part at one end and a hook-part base part at the other end;
    a closing-off body supported by the hook part so as to be capable of swinging about a first shaft, the closing-off body coming into contact with the hook-part distal-end part of the hook part, when located at a closing-off position, and separating from the hook-part distal-end part to open an entrance of the hook part when located at an open position; and
    a first urging member for urging the closing-off body from the open position toward the closing-off position;
    the closing-off body comprising:
        a closing-off-body base part, which is a portion supported by the hook part;
        a first arm part capable of opening and closing the entrance of the hook part, the first arm part extending from the closing-off-body base part; and
        a second arm part extending from the closing-off-body base part, the second arm part extending along a direction different from the direction along which the first arm part extends;
    the second arm part comprising a closing-off-body operation part for causing the closing-off body to move from the closing-off position to the open position and a bent part which is provided to the second arm part such that the position of the closing-off-body operation part approaches the hook-part base part;
    the closing-off-body operation part being arranged on an opposite side of the hook part from the entrance;
    the safety hook further being equipped with a lock member for securing the closing-off body in the closing-off position;
    the lock member comprising a lock-member base part pivotally attached to the hook part;
    the lock member further comprising a lock-member operation part for operating the lock member, operation of the lock-member operation part making it possible to unlock the lock member from the closing-off body; and
    the lock-member operation part being arranged on the same side of the hook part as the closing-off-body operation part; and
    the lock-member operation part being arranged further away from the lock-member base part than is the closing-off-body operation part.

2. The safety hook according to claim 1, wherein:
    both the closing-off-body operation part and the lock-member operation part can be operated while the hook-part base part is supported in one hand, without changing the position of the palm of the one hand.

3. The safety hook according to claim 2, wherein:
    the closing-off-body operation part and the lock-member operation part are configured such that the lock member can be unlocked, and the closing-off body can be moved from the closing-off position to the open position, by an action in which the thumb and a finger other than the thumb are moved in directions such that the thumb and the finger other than the thumb move relatively closer to each other.

4. The safety hook according to claim 2, wherein:
    the safety hook further comprises a second urging member for urging the lock member from an unlocked position toward a locked position; and
    an urging force of the second urging member is less than an urging force of the first urging member.

5. The safety hook according to claim 1, wherein:
    the closing-off-body operation part and the lock-member operation part are configured such that the lock member can be unlocked, and the closing-off body can be moved from the closing-off position to the open position, by an action in which the thumb and a finger other than the thumb are moved in directions such that the thumb and the finger other than the thumb move relatively closer to each other.

6. The safety hook according to claim 5, wherein:
the safety hook further comprises a second urging member for urging the lock member from an unlocked position toward a locked position; and
an urging force of the second urging member is less than an urging force of the first urging member.

7. The safety hook according to claim 1, wherein:
the safety hook further comprises a second urging member for urging the lock member from an unlocked position toward a locked position; and
an urging force of the second urging member is less than an urging force of the first urging member.

* * * * *